Patented Nov. 21, 1950

2,530,616

UNITED STATES PATENT OFFICE 2,530,616

RECOVERY OF VANADIUM AND CHROMIUM

Franklin L. Kingsbury, Westfield, and Frank J. Schultz, Fords, N. J., assignors to National Lead Company, New York, N. Y., a corporation of New Jersey No Drawing. Application September 17, 1948, Serial No. 49,856

4 Claims. (Cl. 23—140)

The present invention relates to the recovery of valuable metal impurities contained in industrial waste acid liquors. It has particular reference to the recovery of vanadium values from waste sulfuric acid liquors which result from the manufacture of titanium dioxide pigments.

Ilmenite is the titaniferous ore most commonly utilized as raw material for the manufacture of titanium dioxide pigments by processes which include solubilizing the ore with sulfuric acid to form sulfate solutions of the ilmenite followed by hydrolytic precipitation of hydrous titanium oxide from such solutions. Most natural occurring ilmenites contain as impurities small amounts of vanadium and other metals, e. g. chromium, manganese, columbium, tantalum, molybdenum and rare earth elements which after hydrolysis of the ilmenite, solutions are practically all found in the waste sulfuric acid hydrolysis mother liquor.

It is well known in the prior art that acid solutions of vanadium salts in the presence of ferrous salts may be hydrolyzed together with iron hydroxide by neutralizing the solution to a pH of 5.5 to 6.0. This prior art procedure is objectionable in that considerable amounts of hydrated iron oxides is precipitated with the hydrated vanadium oxides and the resultant precipitate has an exceedingly colloidal and slimy nature which results in slow filtration rates. The vanadium is precipitated as tetravalent hydrated vanadium oxides by this method.

The subsequent prior art method for the extraction and separation of vanadium from vanadium enriched precipitates is by caustic treatment to produce alkali metal vanadate solution. However, since vanadium in the tetravalent form is difficultly solubilized in alkali, this method of purification cannot be satisfactorily utilized.

It is also known that pentavalent vanadium salt is hydrolyzed in mineral acid solutions at a pH of 2-3 by boiling but in such cases, titanium and iron salts must be absent because under these conditions, they are also hydrolyzed.

The primary object of the present invention therefore is to provide an improved method for the recovery of hydrated vanadium and chromium oxides from acid liquors containing iron. Another object is to provide an orderly and economical method for the removal of vanadium and chromium together with only a minor amount of the iron contained in acid waste liquors. Still another object is to produce a vanadium and chromium enriched concentrate eminently suited for further concentration and purification in subsequent steps or recovery processes. These and other objects will be apparent from the following description.

In its broadest aspects, the present invention contemplates the substantially complete removal of vanadium, and if present, chromium values from solutions containing relatively large amounts of dissolved iron salts by selectively oxidizing the chromium and vanadium at carefully predetermined pH values and simultaneously or subsequently precipitating the vanadium and chromium values and thereafter removing the precipitate from the supernatent liquor containing the iron salts.

In practicing the present invention, the iron in the vanadium chromium containing solution is first reduced to the ferrous state, preferably by introducing sufficient scrap iron to reduce all the ferric salts to the ferrous state. When all the iron has been reduced to the ferrous state, an alkaline reagent, for instance, sodium hydroxide, sodium carbonate, sodium bicarbonate, or the like, is added, preferably with stirring, in a sufficient amount to bring the pH of the solution to about from $pH=2$ to not more than $pH=5$, preferably about $pH=3$. When the desired pH value is reached, an oxidizing agent, such as hydrogen peroxide, ammonium thiosulfate, or chlorine is added in an amount slightly in excess of that required to oxidize all of the vanadium and chromium from the tetravalent to the pentavalent state. Care should be exercised that the amount of oxidizing agent is sufficient to oxidize all the vanadium and chromium present, with only sufficient excess to insure the oxidization of these elements without any material degree of oxidation of the iron.

At the pH range of from 2 to not more than 5, and with the limited amount of oxidizing agent added, vanadium and chromium will selectively and rapidly oxidize preferentially with respect to the iron. Under these conditions, the iron oxidizes very slowly. During the oxidization, the pH value of the solution should be maintained at a relatively constant value by adding to the solution an alkaline reagent if an acidic oxidizing agent is used, or by the addition of an acidic reagent if the oxidizing agent is alkaline.

The vanadium and chromium values will precipitate during the oxidation step provided the pH of the solution is maintained from about 4 to 5. However, since ferrous iron begins to oxidize and then hydrolyze readily at a pH value of 5.5 and above it is preferred to carry out the oxidation step at a pH of about 3. With the preferred oxidation method the vanadium and chromium values will remain in solution and are subsequently precipitated by adjusting the pH of the oxidized solution to from about 4 to about 5.

The hydrates of vanadium and chromium settle readily and are easily removed by filtration from the supernatant liquor containing the iron. The filter cake containing the vanadium and chromium hydrates may then be treated to recover the vanadium and chromium in any suitable manner. The following examples further illustrate the invention.

Example I 100 ml. of a dilute sulfuric acid solution containing 6.7 g. of Fe and 0.2 g. of V present as sulfates were treated with scrap iron in an amount sufficient to reduce ferric iron to ferrous. The excess sulfuric acid was then neutralized to a pH of 3.0 by adding thereto a 10% $Na_2CO_3$ solution. 20 drops of 30% hydrogen peroxide (approximately 0.3 grams $H_2O_2$) were added to the solution with stirring. The solution was then further neutralized to a pH of 4.5 by the addition of more 10% $Na_2CO_3$ solution which caused the vanadium hydrate to precipitate. The precipitate was easily filtered and washed. The results of the separation were as follows:

| Element | Content in Original Solution | Content in Filtrate | Content in Filter Cake |
|---|---|---|---|
|  | G. | G. | G. |
| V | 0.2 | 0.01 | 0.19 |
| Fe | 6.7 | 6.1 | 0.6 |

The results show a recovery of 95% of the vanadium values present as hydrates in the filter cake.

Example II

Three liters of a dilute sulfuric acid solution containing 24 gpl. Fe, 0.087 gpl. V, and 0.01 gpl. Cr present as sulfates processed in accordance with the method described in Example I and the following results were obtained:

| Element | Content in Original Solution | Content in Filtrate | Content in Filter Cake |
|---|---|---|---|
|  | G. | G. | G. |
| V | 0.26 | 0.0 | 0.26 |
| Fe | 72.0 | 71.0 | 1.0 |
| Cr | 0.03 | 0.0 | 0.03 |

The values obtained for the filter cake show a 100% separation of vanadium and chromium from the solutions.

When other elements, such as manganese, columbium, tantalum, molybdenum and rare earth elements are present in the solution, these also will be precipitated with the chromium and vanadium hydrates in practicing the present invention and will be found in the filter cake.

While this invention has been described and illustrated by the examples given, it is not intended to be limited thereto and other modifications and variations may be employed within the scope of the following claims.

We claim:

1. Method for recovering vanadium and chromium values from iron salt solutions containing the same wherein the iron is in ferrous conditions which comprises adding to said solution an alkaline reagent to reduce the acidity thereof to from about pH=2 to not more than pH=5, adding an oxidizing agent in amount selectively to oxidize the vanadium and chromium but not the iron, adjusting and maintaining the solution at an acidity thereof from about pH=4 to pH=5 to precipitate the vanadium and chromium values, and separating the precipitated values from the supernatant liquor.

2. Method for recovering vanadium and chromium values from iron salt solutions containing the same which comprises reducing the ferric iron in such solution to ferrous condition, adding thereto an alkaline reagent to reduce the acidity thereof to from about pH=2 to not more than pH=5, adding an oxidizing agent in amount selectively to oxidize the vanadium and chromium but not the iron, adjusting and maintaining the solution at an acidity thereof from about pH=4 to pH=5 to precipitate the vanadium and chromium values, and separating the precipitated values from the supernatant liquor.

3. Method for recovering vanadium and chromium values from iron salt solutions containing the same which comprises reducing the ferric iron in such solution to ferrous condition, adding thereto an alkaline reagent to reduce the acidity thereof to about pH=3, then adding an oxidizing agent selectively to oxidize the vanadium and chromium but not the iron, adjusting and maintaining the solution at an acidity thereof from about pH=4 to pH=5 to precipitate the chromium and vanadium values, and separating the so-precipitated values from the supernatant liquor.

4. Method for recovering vanadium and chromium values from iron salts solutions containing the same which comprises reducing the ferric iron in such solution to ferrous condition, adding thereto an alkaline reagent to reduce the acidity thereof to about pH=3, then adding an oxidizing agent selectively to oxidize the vanadium and chromium values but not the iron while maintaining substantially constant the pH value of said solution during said oxidation, adjusting and maintaining the solution at an acidity thereof from about pH=4 to pH=5 to precipitate the chromium and vanadium values, and separating the so-precipitated values from the supernatant liquor.

FRANKLIN L. KINGSBURY.
FRANK J. SCHULTZ.

REFERENCES CITED

The following references are of record in the file of this patent:

UNITED STATES PATENTS

| Number | Name | Date |
|---|---|---|
| 1,286,400 | Pellagrin | Dec. 3, 1918 |
| 1,945,611 | Knight et al. | Feb. 6, 1934 |
| 2,199,696 | Fleck | May 7, 1940 |
| 2,365,202 | Marek | Dec. 19, 1944 |